US 7,665,782 B2

(12) United States Patent
Buzby et al.

(10) Patent No.: US 7,665,782 B2
(45) Date of Patent: Feb. 23, 2010

(54) PICK UP DEVICE WITH LOCKING MECHANISM AND LEVERAGE ACTION TRIGGER

(75) Inventors: David Buzby, San Francisco, CA (US); Dinosio Rodriguez, Laguna Niguel, CA (US)

(73) Assignee: Reid Industries, San Francisco, CA (US)

(*) Notice: Subject to any disclaimer, the term of this patent is extended or adjusted under 35 U.S.C. 154(b) by 0 days.

(21) Appl. No.: 11/503,397

(22) Filed: Aug. 12, 2006

(65) Prior Publication Data
US 2007/0035144 A1   Feb. 15, 2007

Related U.S. Application Data

(60) Provisional application No. 60/707,689, filed on Aug. 12, 2005.

(51) Int. Cl.
*A45F 5/00*   (2006.01)
(52) U.S. Cl. ....................................................... 294/19.1
(58) Field of Classification Search ................. 294/19.1, 294/24, 103.1; 56/333; 81/53.12; 7/161
See application file for complete search history.

(56) References Cited

U.S. PATENT DOCUMENTS

| 388,776 | A | 8/1888 | Hall |
|---|---|---|---|
| 826,160 | A | 7/1906 | Hall |
| 944,214 | A | 12/1909 | Rydquist |
| 1,051,374 | A | 1/1913 | Agin |
| 2,613,100 | A | 10/1952 | Casey |
| 2,616,741 | A | 11/1952 | Ziese |
| 3,219,376 | A | 11/1965 | Peters |
| 3,346,293 | A | 10/1967 | Wilcox |
| 3,576,343 | A | 4/1971 | Juhlin et al. |
| 3,761,121 | A | 9/1973 | Reid |
| 3,934,915 | A | 1/1976 | Humpa |
| 4,039,216 | A | 8/1977 | Soos |
| 4,374,600 | A | 2/1983 | van Zelm |
| 4,398,759 | A | 8/1983 | Manola |
| 4,613,179 | A | 9/1986 | van Zelm |
| 4,647,094 | A * | 3/1987 | Bergkvist et al. .......... 294/19.1 |
| 4,669,769 | A * | 6/1987 | Polder, Jr. .................. 294/19.1 |
| 4,758,035 | A | 7/1988 | Shimasaki |
| 4,863,204 | A | 9/1989 | Peters |
| 4,962,957 | A | 10/1990 | Traber |
| 5,154,465 | A | 10/1992 | Pakosh |
| 5,380,054 | A | 1/1995 | Galvis |
| 5,577,785 | A | 11/1996 | Traber et al. |

(Continued)

FOREIGN PATENT DOCUMENTS

FR   1080718   12/1954

OTHER PUBLICATIONS

"Robot Claw Grabber" by Toysmith, from http://web.archive.org/web/20050227054600/http://www.toys2wish4.com/robclawgrab.html.

*Primary Examiner*—Paul T Chin
(74) *Attorney, Agent, or Firm*—Quine Intellectual Property Law Group, P.C.; Paul Littlepage

(57) ABSTRACT

This invention provides hand operated portable devices for grasping and manipulation of objects as well as methods of their use. Embodiments of the devices of the invention comprise two opposing angled jaw members that are operated by a user-controlled trigger through a linkage lever as well as comprise a locking mechanism allowing locking of the jaw members.

10 Claims, 11 Drawing Sheets

U.S. PATENT DOCUMENTS

| | | |
|---|---|---|
| 5,590,923 A | 1/1997 | Berger et al. |
| 5,857,723 A | 1/1999 | Mathieu et al. |
| 5,895,082 A | 4/1999 | Kaluzny |
| 6,257,634 B1 * | 7/2001 | Wei .................... 294/19.1 |
| 6,457,761 B1 | 10/2002 | Benoit |
| 6,508,496 B1 | 1/2003 | Huang |
| 6,513,844 B1 | 2/2003 | Hsu |
| 6,520,556 B1 | 2/2003 | Hsu |
| 6,669,254 B2 | 12/2003 | Thom et al. |
| 6,739,637 B2 * | 5/2004 | Hsu .................... 294/19.1 |
| 6,848,731 B2 | 2/2005 | Khubani et al. |
| 6,874,833 B2 | 4/2005 | Keith et al. |
| 7,344,171 B1 | 3/2008 | McMullan |
| 2005/0057055 A1 * | 3/2005 | Deal .................... 294/19.1 |

* cited by examiner

PICK UP DEVICE WITH LOCKING MECHANISM AND LEVERAGE ACTION TRIGGER

CROSS-REFERENCE TO RELATED APPLICATIONS

This application claims benefit of, and priority to, U.S. Provisional Application No. 60/707,689 filed Aug. 12, 2005, entitled "Pick Up Device with Locking Mechanism and Leverage Action Trigger." Such prior application is hereby incorporated by reference in its entirety for all purposes.

FIELD OF THE INVENTION

The present invention relates to hand operated portable devices for grasping and manipulation of objects. More specifically, the invention comprises devices for grasping and manipulation of objects, e.g., by persons with limited physical ability due to age, weakness, or the like, and/or for grasping and manipulation of objects out of normal/easy reach of persons.

BACKGROUND OF THE INVENTION

Many persons need the ability to grasp and manipulate objects that are normally out of their reach or that would otherwise be inconvenient or difficult to reach. For example, picking up objects on the ground or on high shelves can often be problematic. Such needs are even greater for persons having limited physical ability (e.g., due to age or infirmity). Such persons can have limited gripping ability or hand strength or can have limited bending or stretching ability, thus, leading to greater need for help in picking up or reaching objects.

While a number of devices have been developed to help in reaching/picking up objects, such prior work has been lacking in a number of areas. For example, such devices typically include a direct ratio between the distance moved of a trigger/handle and the distance moved of a gripping means. Thus, a large hand movement would often be needed to completely grasp small objects, etc. Also, such devices typically require constant pressure to keep the object grasped within the device. The present invention addresses the above and other issues and provides novel devices for grasping and/or manipulation of objects. The current invention also provides additional advantages which will be apparent upon reading of the description, claims, and figures herein.

SUMMARY OF THE INVENTION

In various aspects, the current invention comprises a device for grasping and/or picking up objects. In certain embodiments the device comprises a head region having two opposing jaw members with each member having a proximal end (i.e., an end closer to the handle end and closer to the user of the device when it is held by the handle) and a distal end (i.e., the end further from the handle), and each of which jaw members is operably attached at a pivot point to a jaw base assembly. Such attachment, thus, allows movement of each jaw member around its pivot point. In such embodiments, the proximal end of both jaw members operably interacts with a jaw actuator within the jaw base assembly (typically by inserting into the actuator). In turn, the jaw actuator is operably connected to an actuator rod and a jaw actuator spring (which helps in holding open the jaw members, e.g., when the trigger is not being squeezed or the when it is locked). Such embodiments also comprise an elongated hollow tube region that encloses a cable spring and cable that are operably connected to the actuator rod. Also, such embodiments comprise a handle region comprising a handle body, a latch mechanism (e.g., latching lever, latch cable, latch, latching spring, etc.), and a trigger grip with a linkage lever that has the cable operably coupled to its bottom (i.e., a leverage action trigger). In such embodiments, by squeezing the trigger the linkage lever can be caused to extend downwards in the handle body, which pulls the cable and the cable spring proximally in the handle body and in the tube region. The movement of the cable and cable spring thus causes the jaw actuator rod and jaw actuator to also move proximally, which in turn, draws in the proximal end of each jaw member and causes each jaw member to move around its pivot point so that the distal ends of the opposing jaw members move towards one another.

In certain embodiments, the devices of the invention have jaw members that comprise a textured inner surface layer and/or which comprise a pad area at their proximal tips.

In some embodiments of the device, the jaw actuator spring exerts pressure against the proximal end of the jaw actuator thus causing the distal ends of the jaw members to pivot away from each other as the jaw actuator is pushed distally. Such pressure helps in keeping the jaw members open (extended away from each other) when the trigger/linkage lever is not squeezed and/or locked.

In various embodiments of the device, the latch mechanism comprises a spring loaded latch that is operably attached to a latch cable, which, in turn, is operably coupled to a latching lever. The latch mechanism, when set (or engaged), reversibly locks the trigger/linkage lever, thereby reversibly locking the jaw members at a desired position. Additionally, in such devices, expansion of the cable spring (e.g., when pressure is applied on it from the trigger/linkage lever via the cable) allows the trigger to be squeezed further in, even when the jaw members cannot move closer together (e.g., when an object is being grasped by the device). Such expansion of the cable spring thus allows the trigger to move far enough into the handle body so that if the latching lever is set, the spring loaded latch will engage and prevent the jaw members from opening In the devices herein, movement of the trigger causes a movement of the jaw members over a greater distance than that moved by the trigger (assuming that the jaws are allowed to freely move and are not blocked, etc.).

Also, in some devices herein the handle body comprises a palm rest area that comprises a thermoplastic rubber and/or thermoplastic elastomer overlay on the handle body. Such rest area is located so as to improve user comfort and performance by, e.g., reducing slipping, adding in durability and increasing aesthetics.

In certain embodiments, the head region of the device can be rotated in relation to the tube region, and secured in one or more orientations, e.g., by the interaction of fluted or grooved areas within the tube region and raised protuberances on the inner lumen of the proximal opening of the jaw base assembly.

In other aspects the invention comprises methods of grasping and/or picking up an object. Embodiments of such methods comprise situating two opposing angled jaw members of a device around the object, each of which jaw members comprises a proximal end and a distal end, and each of which jaw members is operably attached at a pivot point to a jaw base assembly (which allows movement of each jaw member around its pivot point). In such methods, the proximal end of both jaw members operably interacts with a jaw actuator (within the jaw base assembly) that is operably connected to an actuator rod. The device used in such method embodiments also comprises an elongated hollow tube region, enclosing a cable spring and cable that are operably connected to the actuator rod. Additionally, the devices in such method embodiments also comprise a handle region comprising a handle body, a latch mechanism, and a trigger grip having a linkage lever, wherein the cable is operably coupled to the bottom of the linkage lever. In various embodiments, after the object is situated, the trigger is squeezed causing the linkage lever to extend downwards in the handle body. Such extension causes the cable and cable spring to move proximally and causes the jaw actuator rod and jaw actuator to move proximally. The movement of the jaw actuator, in turn, draws in the proximal end of each jaw member which causes each jaw member to move around its pivot point and causes the distal ends of the opposing jaw members to move towards one another and thus grasp and/or pick up the object.

In yet other aspects, the invention comprises methods of grasping and/or picking up an object by situating two opposing jaw members of a device around the object (which members are operably attached at pivot points to a base assembly and to a jaw actuator) and squeezing a trigger of the device (which trigger moves a linkage lever and which linkage lever is operably coupled, directly or indirectly, to the opposing jaw members), thereby moving the jaw members towards one another and grasping the object.

These and other devices and methods of the invention will become more fully apparent when the following detailed description is read in conjunction with the accompanying figures and claims.

DETAILED DESCRIPTION

Before describing the present invention in detail, it is to be understood that this invention is not limited to particular embodiments, which can, of course, vary. It is also to be understood that the terminology used herein is for the purpose of describing particular embodiments only, and is not necessarily intended to be limiting. As used in this specification and the appended claims, terms in the singular and the singular forms "a," "an," and "the" include plural referents unless the context clearly dictates otherwise. Thus, for example, reference to "a pick up device," also includes a plurality of pick up devices, and the like.

Figure 1:
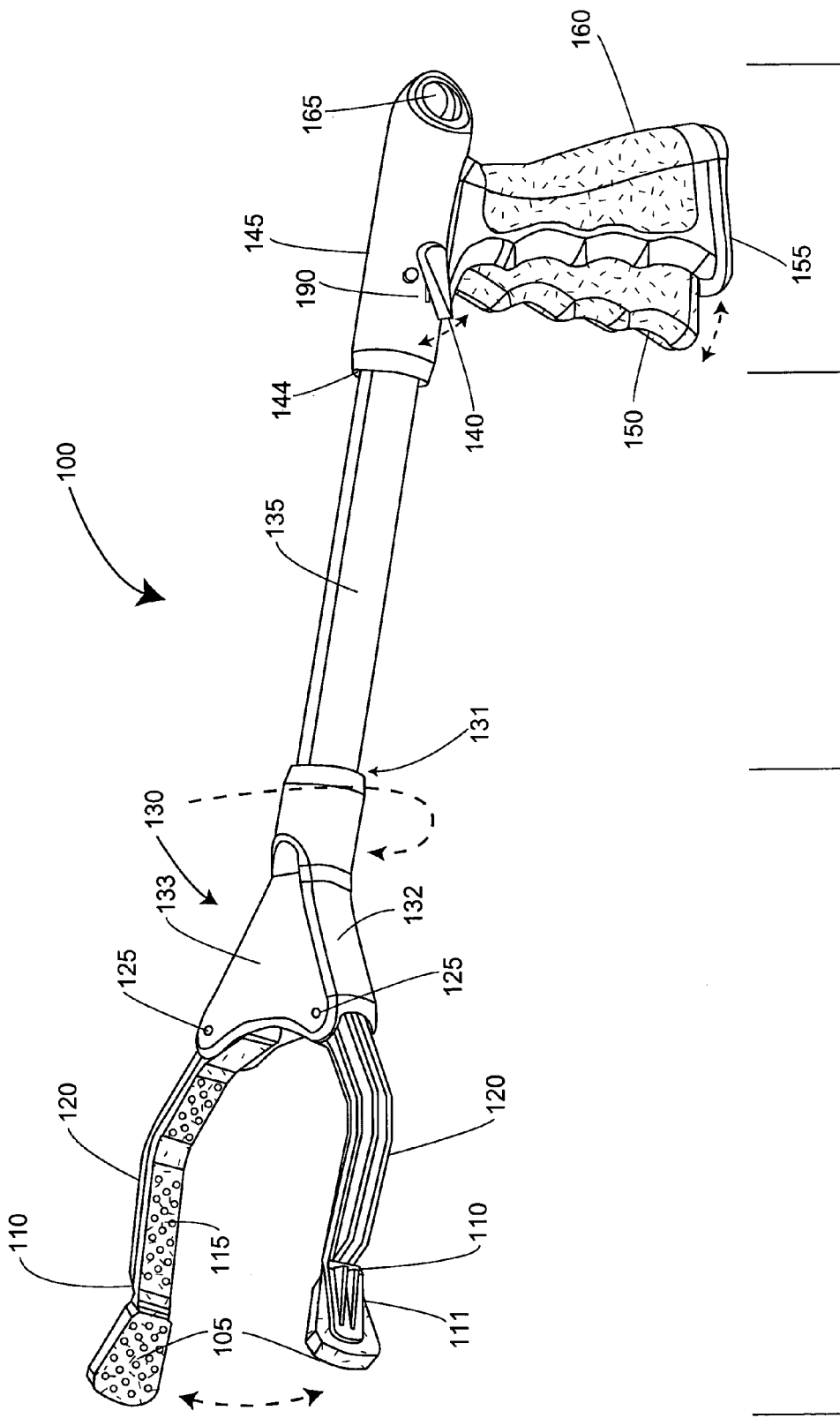
FIG. 1 displays a perspective view of an exemplary pick up device of the invention.
Figure 2:
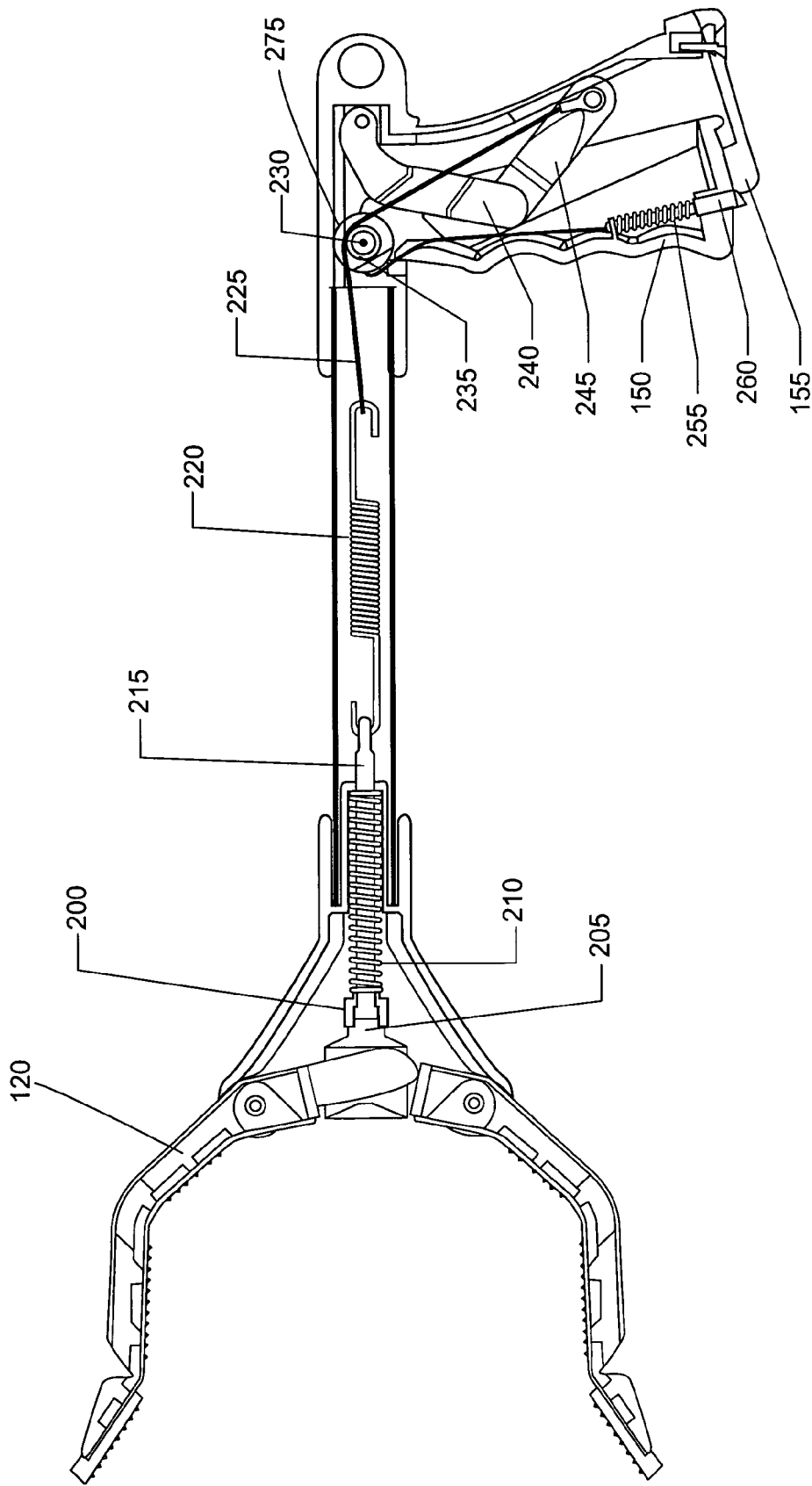
FIG. 2 displays a transverse cut-away view of an exemplary pick up device of the invention with the head of the device rotated vertically.

Exemplary embodiments of the present invention are illustrated in the accompanying figures. A general perspective view is shown in FIG. 1. FIGS. 2 through 11 further detail various embodiments. For purposes of description and illustration, pick up devices of the invention, e.g., pick up device 100, as can be in FIG. 1, can roughly be considered in three sections. Thus, the device in FIG. 1 comprises a head region comprising two opposing jaws, Region A; a tube (or shaft) region, Region B, comprising an elongated tube or hollow structure; and a handle region, Region C, comprising a handle, a trigger, and a locking (or latching) mechanism. While the elements in each section are generally discussed separately herein, it will be appreciated that such description should not be taken as limiting upon either the devices or uses/operation of the invention or upon the interaction or connectivity of the elements of the invention.

Head Region

At the distal end of the device (i.e., the end typically furthest from the user when held by the handle) grasping jaw members 120, of the device oppose one another and form a modified "U" shape when open (e.g., when an object is not being grasped) and form a five-sided or pentagonal shape when closed (e.g., when an object is being grasped or when the jaw members are brought together without grasping an object). As explained more fully below, such shape can aid in grasping a wide range of differently sized objects. Additionally, the jaw shape and arrangement of the jaws (as well as the surface layers, pads, etc.) adds aesthetic interest to the device (e.g., through shape and optionally through colors and/or textures of the various components, contrast in color/texture between various areas, etc. The outer surfaces of the jaw members can optionally be ridged or braced with one or more ribs or the like, e.g., in order to strengthen the members. In certain embodiments, the jaw members are constructed all of one piece. The jaw members can also comprise an overmolded inner layer, or inner surface layer. See below. In certain embodiments, the distal end of each jaw member comprises end region or tip 111, which optionally can be attached to the main body of the jaw member via flexible hinge 110. In other embodiments, the tip is attached or connected to the main body of the jaw member via a nonflexible region, i.e., such embodiments do not comprise a flexible hinge at the region where the tip and the main jaw body intersect.

In certain embodiments, the inner surfaces of the jaw members can comprise inner surface layer 115 e.g., to aid in gripping of objects. The texture of the inner surface layer can be dimpled, roughened, ridged, striated, can comprise bumps or raised dots, or can comprise any other three-dimensional surface texture. In certain embodiments, the inner surface layer comprises a flexible or malleable/conformable surface. Thus, the inner surface layer can also conform at least partially to an object being grasped and thereby help prevent slippage, etc. whether or not the surfaces are "textured." The inner surface layers can be composed of material having a high coefficient of friction to aid in gripping of objects. Additionally, the inner surface layers can comprise one or more coatings to aid in gripping of objects. Such coatings can also comprise those having high coefficients of friction or the like.

In certain embodiments, the jaw members can be comprised without an inner surface layer. In other words, in such embodiments, the inner surfaces of the jaw members themselves grasp objects and the jaw members can be textured (e.g., dimpled, etc.) and/or coated. Thus, in such embodiments, the jaw members can be textured on their inner surfaces rather than being mated with (e.g., through overmolding or adhesion) another inner surface layer of textured material.

When the jaw members are fully closed (e.g., when an object is being grasped or when the device is closed without grasping an object), pad areas 105, can meet one another over substantially their entire surfaces. In some embodiments, the pad areas can optionally meet/touch one another at their distal ends (e.g., when the jaws are brought together lightly or partially) and over substantially their entire areas when the jaws are brought together completely or more fully. It will be appreciated that the tips and pads of the jaw members allow grasping of quite small objects and that the tips and/or the pads can optionally flex and/or conform at least partially to the shape of objects being grasped. In certain embodiments, the pad area is continuous with, and/or part of, the inner surface layer of the jaw member and can be composed of the same material. In certain embodiments, such material (i.e., which composes the pad and/or the inner surface layer of the jaw member) can be overmolded onto the jaw members, thus, forming one solid piece for each jaw member.

As stated, in certain embodiments, the inner surfaces of the jaw members and/or the pads can comprise one or more overmolded pieces of material that comprise the inner surface layer. In other embodiments, the inner surface layers of the jaw members and/or the pads can comprise a material (e.g., comprising an inner surface layer, e.g., a textured surface), which is attached (e.g., via glue/adhesive) to the jaw member rather than overmolded.

The jaw members can optionally be constructed from a number of materials. In certain embodiments, the jaw members comprise Lexan® (available from General Electric, Fairfield, Conn.), while in other embodiments, the jaw members can comprise Delrin® (available from E.I. du Pont de Nemours and Company, Wilmington, Del.). In certain embodiments, the jaw members can comprise metal (e.g., aluminum, anodized aluminum, steel, stainless steel, magnesium, magnesium alloy(s), iron, metal alloys, and/or combinations thereof), plastic (e.g., a polycarbonate, a polyvinyl), a thermoplastic, a thermoplastic rubber, a thermoplastic elastomer, etc., ceramic, polymer, resin, wood, or any combinations thereof. In various embodiments, the inner surface layers of the jaw members, and/or the pads, can comprise the same material as the jaw members or they can comprise a different material than the main body of the jaw members. In particular embodiments, the inner surface layers comprise one or more of: a thermoplastic rubber (TPR), a thermoplastic elastomer (TPE), a silicon rubber, or a rubber. The composition of the inner surface layers and/or the pads is optionally chosen for durability, gripping ability (e.g., a "no-slip" surface), aesthetic interest, etc. In certain embodiments, the inner surface layer and/or pads are textured and/or colored (optionally the same as other parts of the device such as the trigger, palm area on the back of the handle, etc. (e.g., to add additional aesthetic interest). In some embodiments the inner surface layers and/or the pads comprise Lexan, Delrin, metal (e.g., aluminum, anodized aluminum, steel, stainless steel, magnesium, magnesium alloy(s), iron, metal alloy(s), and/or combinations thereof), plastic (e.g., a polycarbonate, a polyvinyl), a thermoplastic, a thermoplastic elastomer, a thermoplastic rubber, etc., ceramic, polymer, resin, wood, or any combinations thereof. In some embodiments, the main body of the jaw members comprises Lexan while the inner surface layers and the pads comprise TPR or TPE.

In certain embodiments, the jaws can open to a maximum distance of at least 6 inches or more from tip to tip (e.g., from tip of pad to tip of pad), to at least 5.5 inches or more from tip to tip, to at least 5 inches or more from tip to tip, to at least 4 inches or more from tip to tip, to at least 3 inches or more from tip to tip, to at least 2 inches or more from tip to tip, or to at least 1 inch or more from tip to tip.

Figure 3:
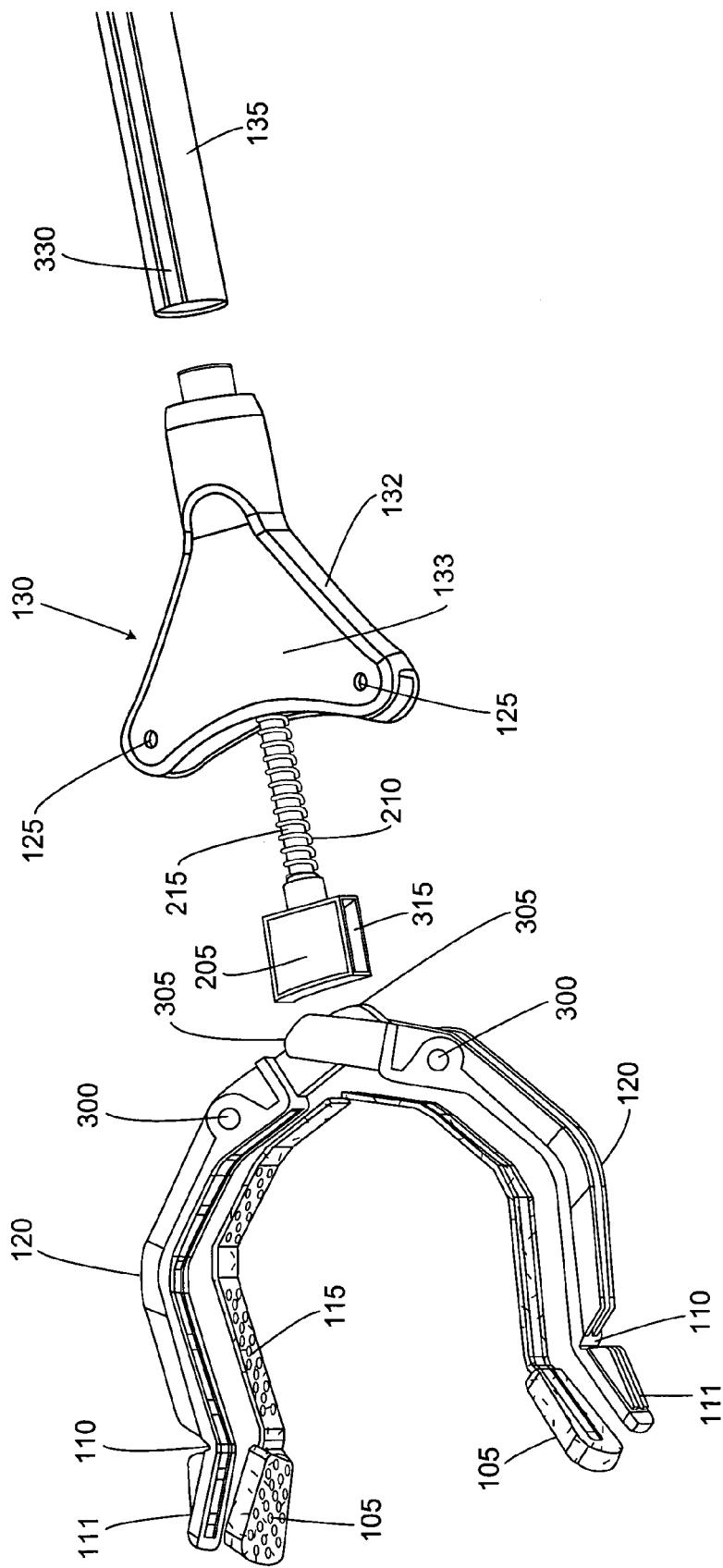
FIG. 3 displays an expanded view of the grasping end (or head region) of an exemplary device of the invention.
Figure 4:
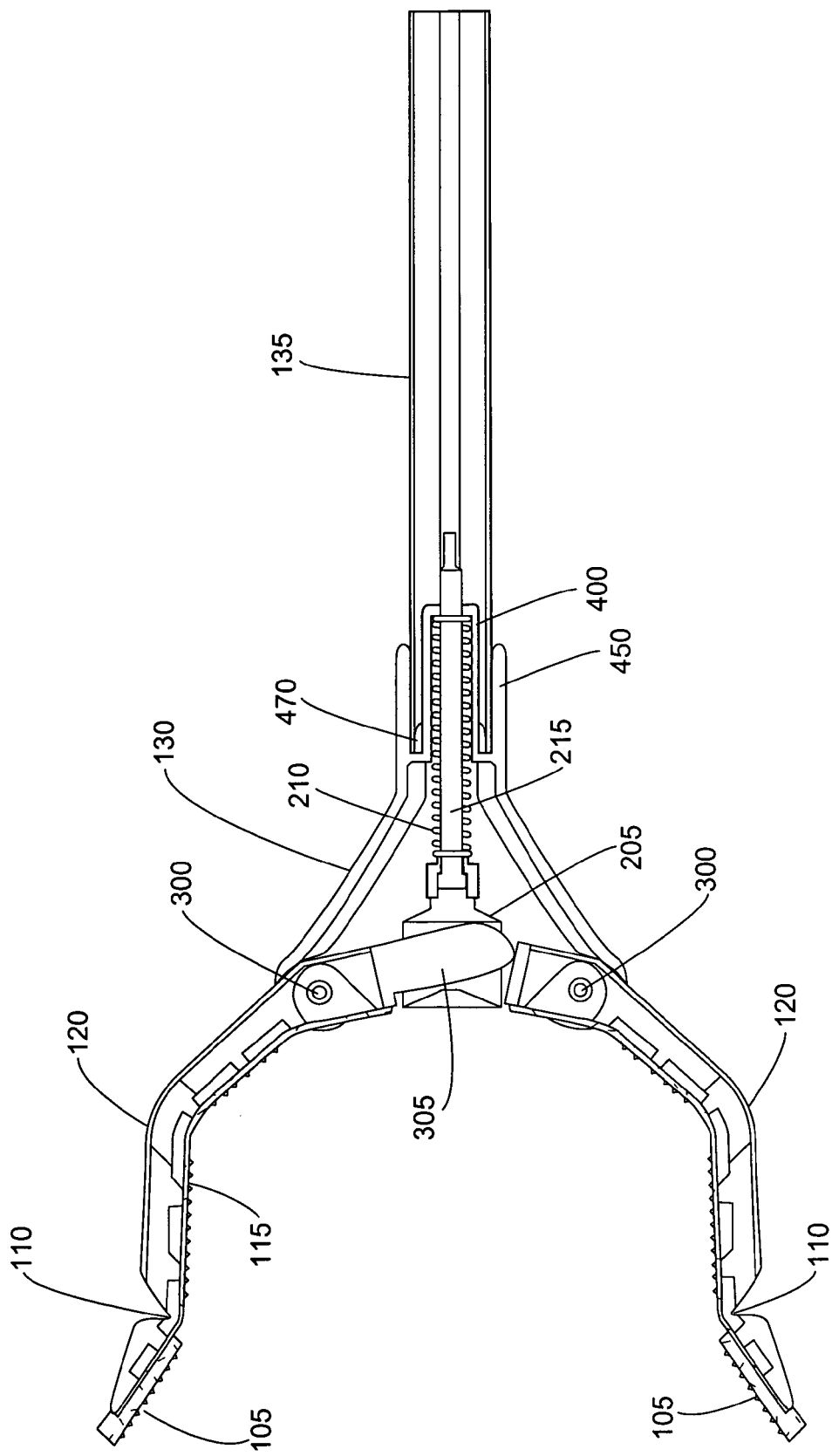
FIG. 4 displays a transverse cut-away view of the grasping end of an exemplary device of the invention.
Figure 5:
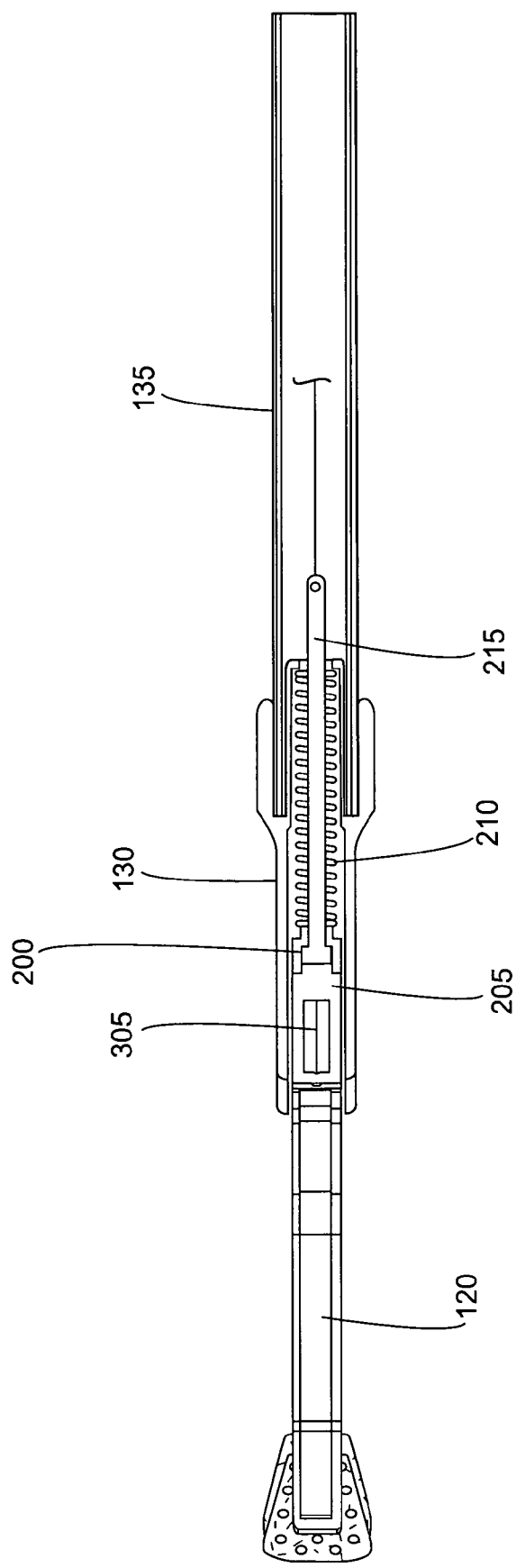
FIG. 5 displays a sagittal cut-away view of the grasping end of an exemplary device of the invention.
Figure 6:
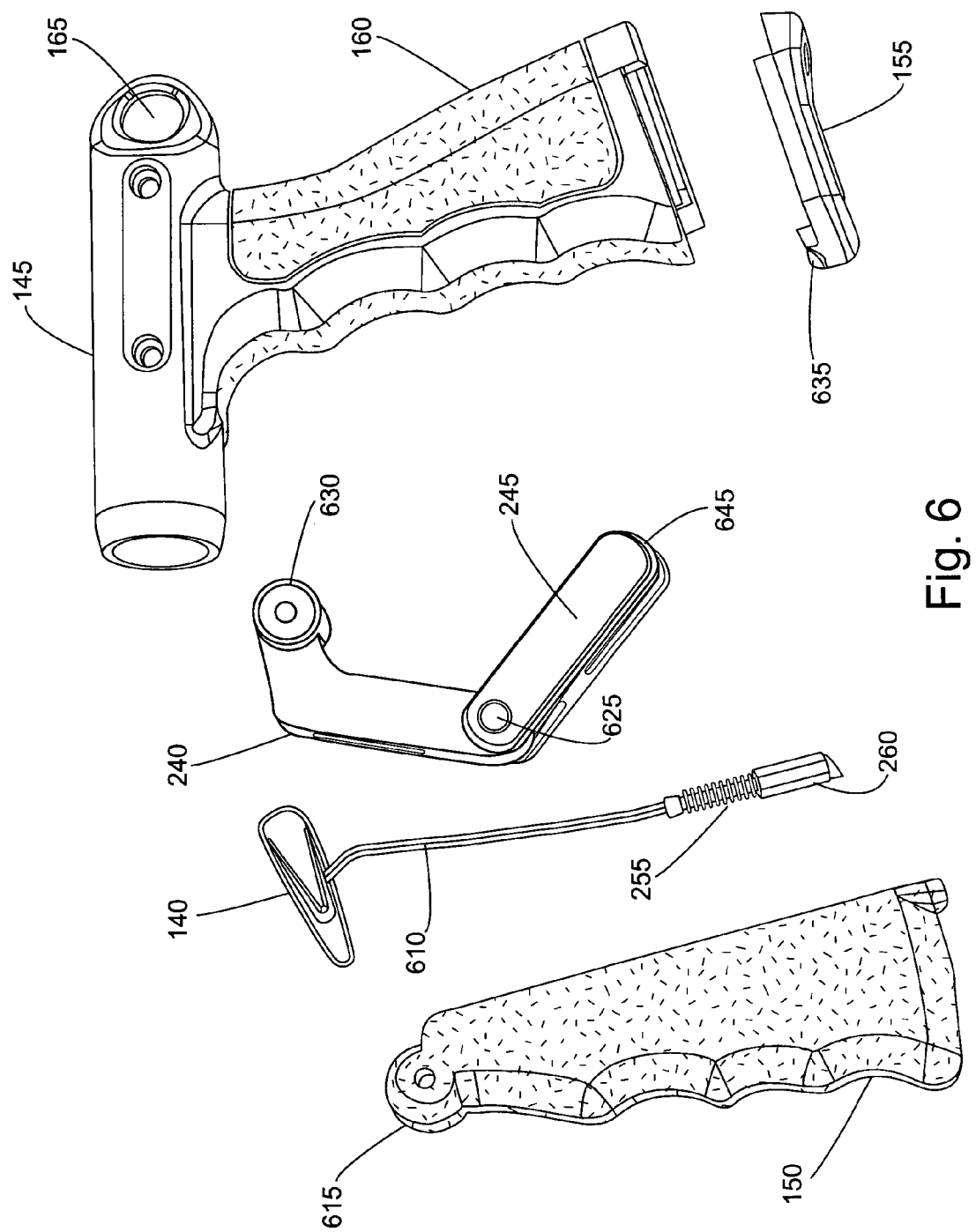
FIG. 6 displays an expanded view of the handle, trigger, linkage lever, and latching mechanism of an exemplary device of the invention.
Figure 7:
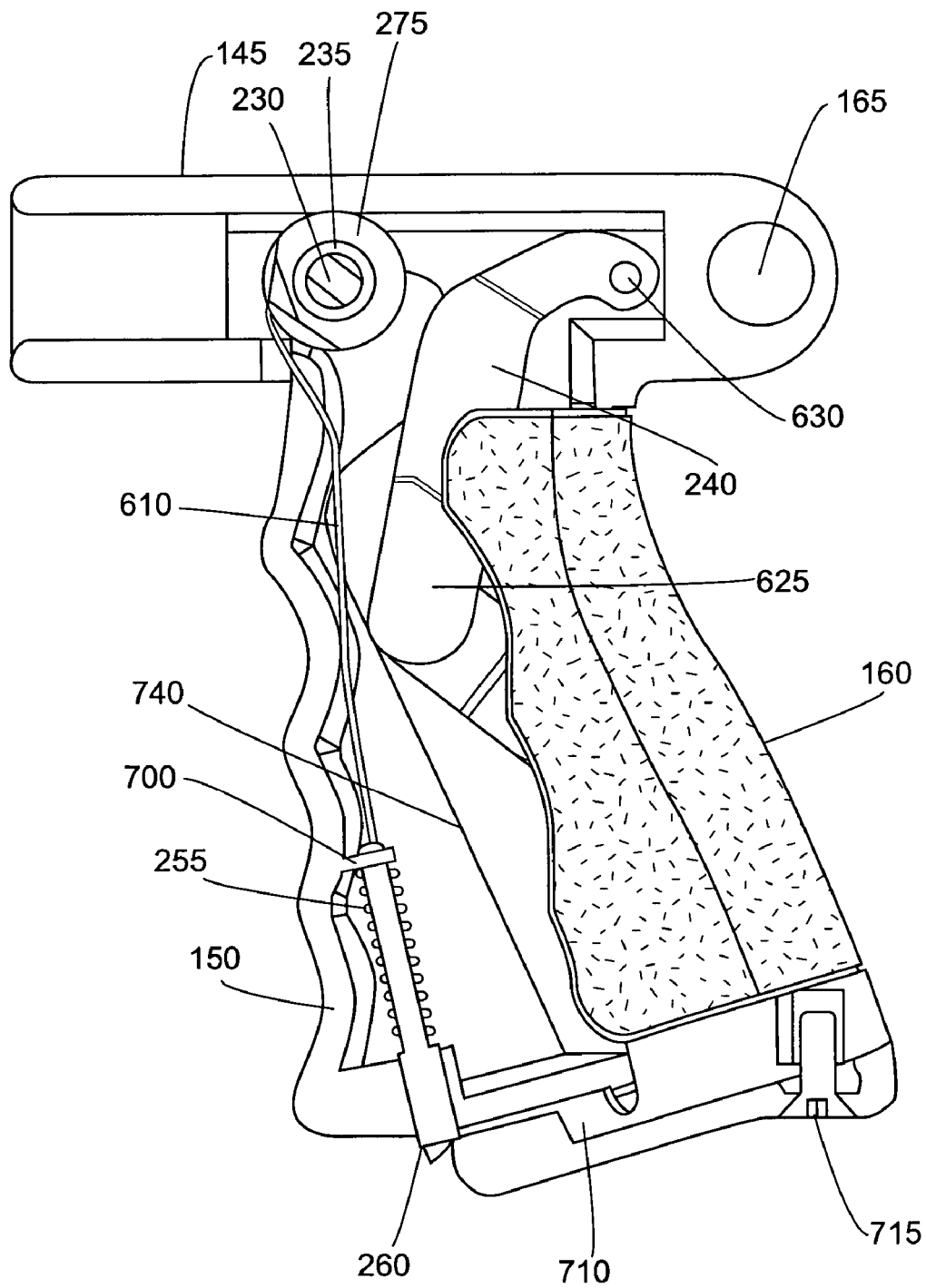
FIG. 7 displays a transverse partial cut-away view of the handle, trigger, linkage lever, and latching mechanism of an exemplary device of the invention.

As can be seen in FIG. 3, proximal ends 305 of the jaw members (i.e., the ends closest to the user when the device is held by the handle) overlap one another within jaw actuator (or clevis), 205. The proximal ends of the jaw members enter through side openings 315 in the jaw actuator. The jaw actuator keeps the proximal ends of the jaw members secure and in the correct orientation. The jaw members rotate around pivot points 300 which are also points 125 where bolts, screws, or other fasteners secure and/or position the pivoting jaw members to the jaw base assembly.

The jaw actuator and the proximal ends of the jaw members are enclosed within jaw base assembly 130. The jaw base assembly comprises two opposing sides 133 (shown as roughly triangular in the attached figures), separated by enclosing sidewall(s) 132. In certain embodiments, the jaw base assembly is molded or fashioned out of one piece of material and is not constructed from smaller pieces. In some embodiments, the jaw base assembly can be composed of separate top, bottom, and sidepieces which are secured together (e.g., via glue, adhesive, fasteners, melting, welding, spot welding, etc.)

The jaw actuator holding the proximal ends of the jaw members is attached, via jaw actuator cap 200 to jaw actuator rod 215 which, in turn, is surrounded by jaw actuator spring 210. Both the spring (e.g., a compression spring) and the rod are housed within the interior of the jaw base assembly. However, in some embodiments, the proximal end of the jaw actuator rod and/or the jaw actuator spring can extend into the hollow tube region of the device. See below. The distal end of the spring pushes against the jaw actuator (e.g., by pushing against the jaw actuator cap), while the proximal end of the spring pushes against stop plate 400 within the jaw base assembly. See FIG. 4. Because the spring pushes against both the jaw actuator and the stop plate, it forces the jaw members apart (i.e., away from one another) when the device is not being triggered (i.e., when the trigger is not squeezed and/or latched). See below.

While, as shown by the dashed motion lines in FIG. 1, the jaw members can move towards or away from one another, it will additionally be appreciated that in certain embodiments, the entire head region of the device can be rotated or pivoted around the elongated tube. See below. Such action can allow proper orientation to grasp specific objects. Cf FIG. 1 and FIG. 2.

In various embodiments, one or more of the jaw actuator, jaw base assembly, jaw actuator cap, jaw actuator rod, and spring can be composed of, e.g., metal (such as aluminum, anodized aluminum, steel, stainless steel, magnesium, magnesium alloy(s), iron, metal alloy(s), and/or combinations thereof), plastic (e.g., a polycarbonate, a polyvinyl, a thermoplastic, a thermoplastic elastomer, a thermoplastic rubber, Lexan, Delrin, etc.), ceramic, polymer, resin, wood, or any combinations thereof. In certain embodiments, the jaw actuator, jaw base assembly, jaw actuator cap, and jaw actuator rod are comprised of plastic(s) (e.g., Lexan and/or Delrin), while the spring is comprised of a metal (e.g., stainless steel, aluminum, anodized aluminum, iron, magnesium, magnesium alloy(s), steel, metal alloy(s), and/or combinations thereof). In some embodiments, the jaw actuator, jaw actuator cap, jaw actuator rod, and spring are comprised of metal (such as aluminum, anodized aluminum, steel, stainless steel, magnesium, magnesium alloy(s), iron, metal alloy(s), and/or combinations thereof) while the jaw base assembly is comprised of plastic (e.g., Lexan and/or Delrin).

The jaw actuator rod 215 is attached to a cable spring 220 (e.g., an extension, or tension, spring) which traverses through tube or hollow structure 135 and is attached to cable (or in some embodiments, rod, strap, articulated strap, wire, chain, or other similar cable-like element) 225. In various embodiments, the cable spring can comprise different lengths, can comprise different spring stiffness, and can comprise different ratios of spring length to cable and/or actuator rod length (e.g., in some embodiments the spring traverses ~¼ of the length of the tube while the cable, and optionally part of the jaw actuator rod, traverses ~¾ length of the tube, etc.).

Tube Region

As can be seen in the Figures, hollow tube 135 connects the head region of the device with the handle region of the device. In various embodiments, the ends of such elongated tube mate with proximal end 131 of the jaw base assembly and with distal end 144 of the handle. In certain embodiments, the ends of the tube are inserted within the jaw base assembly and the handle. The ends of the jaw base assembly and the handle can have specific diameters at such mating points so that the tube fits snugly therein. The tube can be held in place with the jaw base assembly and the handle by friction, by glue or adhesive, by spot welds, by crimping, by screws, bolts, clamps, or the like, or by any combination thereof. The tube can be of different lengths and diameters in different embodiments, thus, changing the overall length of the pick up device in different embodiments. In some embodiments, the tube/shaft comprises a telescoping shaft, thus, allowing the shaft to be adjusted in length for that embodiment (e.g., similar to a telescope, etc.). In some such telescoping embodiments, the flutes in the shaft can aid in stability and orientation of the telescoping pieces. In various embodiments, the elongated tube is constructed from or comprises, e.g., aluminum, anodized aluminum, steel, stainless steel, iron, magnesium, magnesium alloy, or various metallic alloys, plastic (e.g., a polycarbonate, a polyvinyl, a thermoplastic, a thermoplastic elastomer, a thermoplastic rubber, Lexan, Delrin, etc.), ceramic, polymer, resin, or any combinations thereof. In certain embodiments, the tube comprises anodized aluminum, while in other certain embodiments, the tube comprises Lexan and/or Delrin.

In certain embodiments, the tube comprises flutes or grooved areas 330, which can, e.g., add structural integrity and/or strength to the tube and/or help guide (in some embodiments) the internal cable spring and/or cable. Such fluting also can add decorative interest and can in certain embodiments, aid in rotation of the head region around the shaft.

In certain embodiments, the inner surface of the proximal end of the jaw base assembly (e.g., 450 in FIG. 4) can comprise one or more ridges, knobs, dots, or other similar raised protuberances (e.g., ridge 470 in FIG. 4) that rest within the flute(s) in the shaft. Such ridges, etc. can act to stabilize the head region in a particular orientation in relation to the shaft. Furthermore, certain embodiments can comprise multiple ridges in the jaw base assembly mated with multiple flutes within the shaft, while some embodiments can comprise a greater number of flutes than of ridges. In certain embodiments, the jaw base assembly and the shaft are not permanently affixed (e.g., they are not welded, glued together, etc.), but rather they are held together by, e.g., the presence and connections of the internal mechanism (e.g., the jaw actuator, jaw actuator rod, cable spring), the friction between the tube and the jaw base assembly, etc. Thus, since the cable spring allows play in length, the head region can be pulled slightly out (e.g., away from the shaft) so that the ridge(s) within the flute(s) stabilizing the head region are removed from the flute(s). Thus, the head region can then be rotated and then moved back towards the shaft so that the ridge(s) re-enter different flute(s) and stabilize the rotated head region in a new and different orientation in relation to the shaft/handle. It will be appreciated that some embodiments comprise a plurality of flutes and ridges thus allowing a fine degree of control over head rotation. In some such embodiments, the actuator rod interacts with the jaw actuator cap such that they does not prohibit rotation of the head region (e.g., the activator cap freely circles around the jaw actuator rod, etc.).

Again, within tube 135, cable spring 220, is attached at its distal end to jaw actuator rod 215. Such attachment can be by hook arrangement or by crimping, clipping, welding, adhesive/glue, or any other appropriate method. In some embodiments, the cable spring and the jaw actuator rod can be connected through one or more intermediary(ies) (e.g., another cable, etc.) At its proximal end, the cable spring is attached to cable (or in some embodiments strap, articulated strap, wire, chain, or other similar cable-like member) 225. The cable, which traverses the proximal portion of main tube 135 enters handle 145 of the device and interacts with the lever linkage. See below. In various embodiments, the cable spring and cable comprise stainless steel, while in other embodiments, the cable spring and cable comprise a metal, aluminum, anodized aluminum, steel, magnesium, magnesium alloy(s), iron, or various alloys, nylon, and/or combinations thereof.

Handle Region

As can be seen in the accompanying figures, the handle region (region C in FIG. 1) comprises a number of features. The handle itself comprises a form designed to be grasped by the hand of a user. In certain embodiments, handle body 145 is comprised from a single piece of material, with handle cap 155, latch lever 140, and trigger grip (or "trigger") 150, being attached to the single body of the handle. Such single piece construction aids in strength and stability of the device. However, in other embodiments, the handle body can be constructed from a number of pieces, e.g., two mirrored pieces which are fitted together and to which are attached the handle cap, latch lever, and trigger grip, etc. In some embodiments, the handle comprises a hook or ring feature to allow the device to be hung or to have a cord/lanyard attached to the device (e.g., to allow the device to be hung). Thus, ring 165 is shown in the figures.

Trigger grip 150, (also referred to as trigger 150) in certain embodiments, comprises two mirrored pieces which are joined together (e.g., by adhesives, temperature setting or melting, friction forces, etc.) or are placed adjacent to one another, but not joined. Other embodiments comprise trigger grips comprised of a single formed piece. In either case, such trigger grip is typically ergonomically shaped to allow for easy finger placement for the user and for aesthetic style. Thus, as can be seen from the figures, the trigger grip comprises raised ridges and depressions for finger placement. It will also be appreciated that the sides of the handle body (alternatively and/or in addition to the trigger) can comprise ridges and other shapes to produce an ergonomic grip. The trigger grip attaches to the handle body at a pivot point created by threading of latching lever shaft 230 through openings in trigger grip pivot areas 615. When the trigger grip pivots from such point, the base of the trigger grip slides into the body of the handle when the trigger is squeezed by a user. As will be appreciated, the interaction of the handle and the trigger do not present sharp edges or openings where a user's fingers could be pinched or injured. As explained further below, when the trigger grip is squeezed and moves into the handle body, the latch and the linkage lever are moved as well.

Also attached to the handle body is latching lever 140 and latching lever shaft 230. As mentioned, the latching lever shaft threads through openings in trigger grip pivot areas 615 and the handle body. The latching lever(s) are placed on one or both ends of the shaft (i.e., on either one or both sides of the handle body). See below.

The handle cap is attached at the base of the handle body. The cap is secured to the base via screw 715, or similar fastener in various embodiments. However, in other embodiments, the cap is attached to the handle body by adhesives, temperature setting, friction forces, etc. and optionally does not comprise a screw or the like. The handle cap comprises latch recess area 710 into which the latch fits when the device jaws are locked. See below.

In various embodiments, the handle body, handle cap, trigger grip, and lever latch are comprised of or comprise, e.g., metal, aluminum, anodized aluminum, steel, stainless steel, magnesium, magnesium alloy(s), iron, metal alloy(s), plastic (e.g., a polycarbonate, a polyvinyl, a thermoplastic, a thermoplastic elastomer, a thermoplastic rubber, Lexan, Delrin, etc.), ceramic, polymer, resin, or any combinations thereof. In certain embodiments the handle body, handle cap, trigger grip, and lever latch are comprised of Lexan and/or Delrin. In yet other embodiments, the handle body, handle cap, trigger grip, and lever latch are comprised of Lexan and/or Delrin while palm rest area 160 (and optionally the trigger grip) also comprises an overmolded layer of thermoplastic rubber or thermoplastic elastomer for improved gripping, comfort, and/or aesthetics. In yet other embodiments, the palm rest on the back of the handle (and optionally the trigger grip) comprises a thermoplastic rubber or a thermoplastic elastomer.

Figure 8:
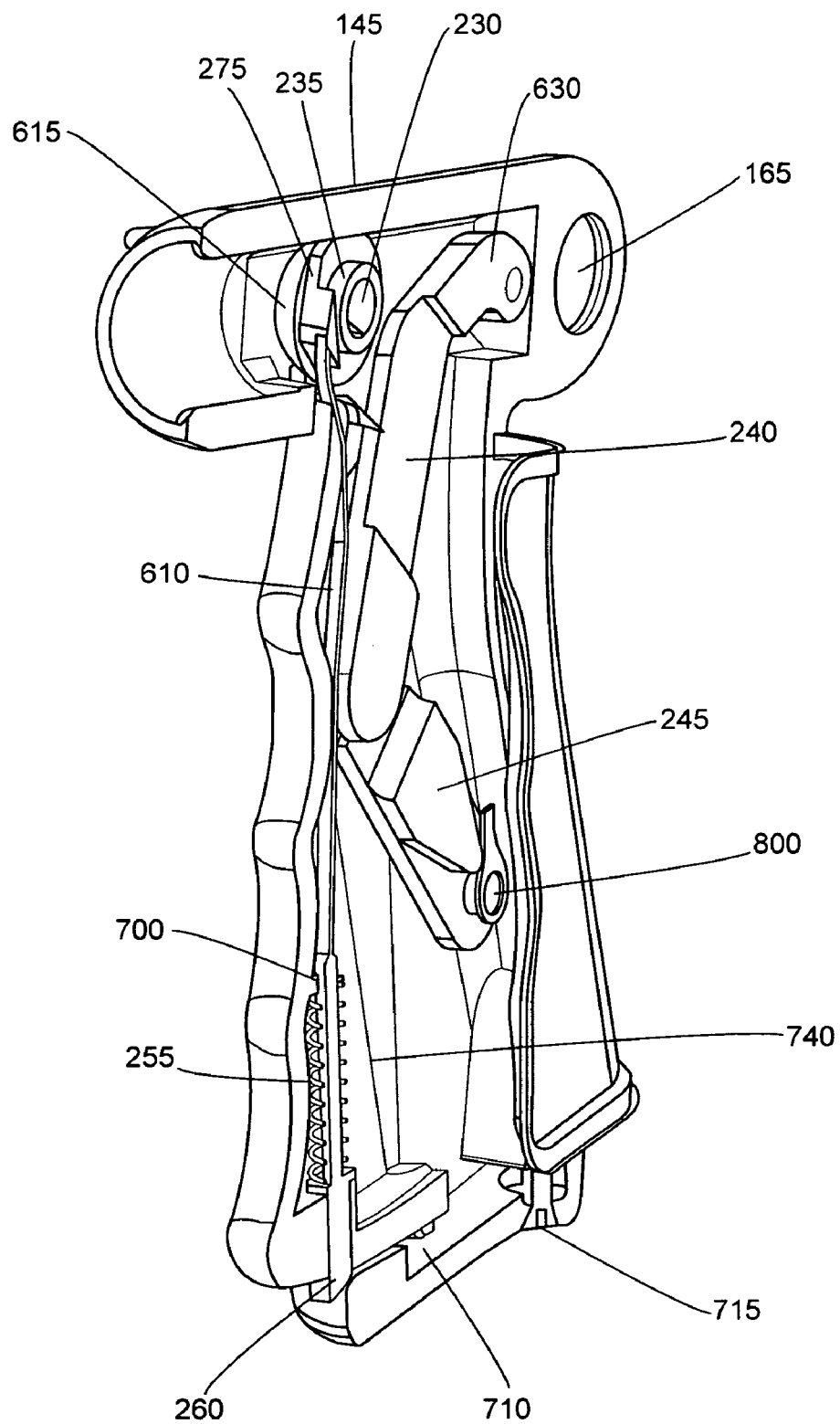
FIG. 8 displays a perspective view of a transverse partial cut-away of the handle, trigger, linkage lever, and latching mechanism of an exemplary device of the invention.
Figure 9:
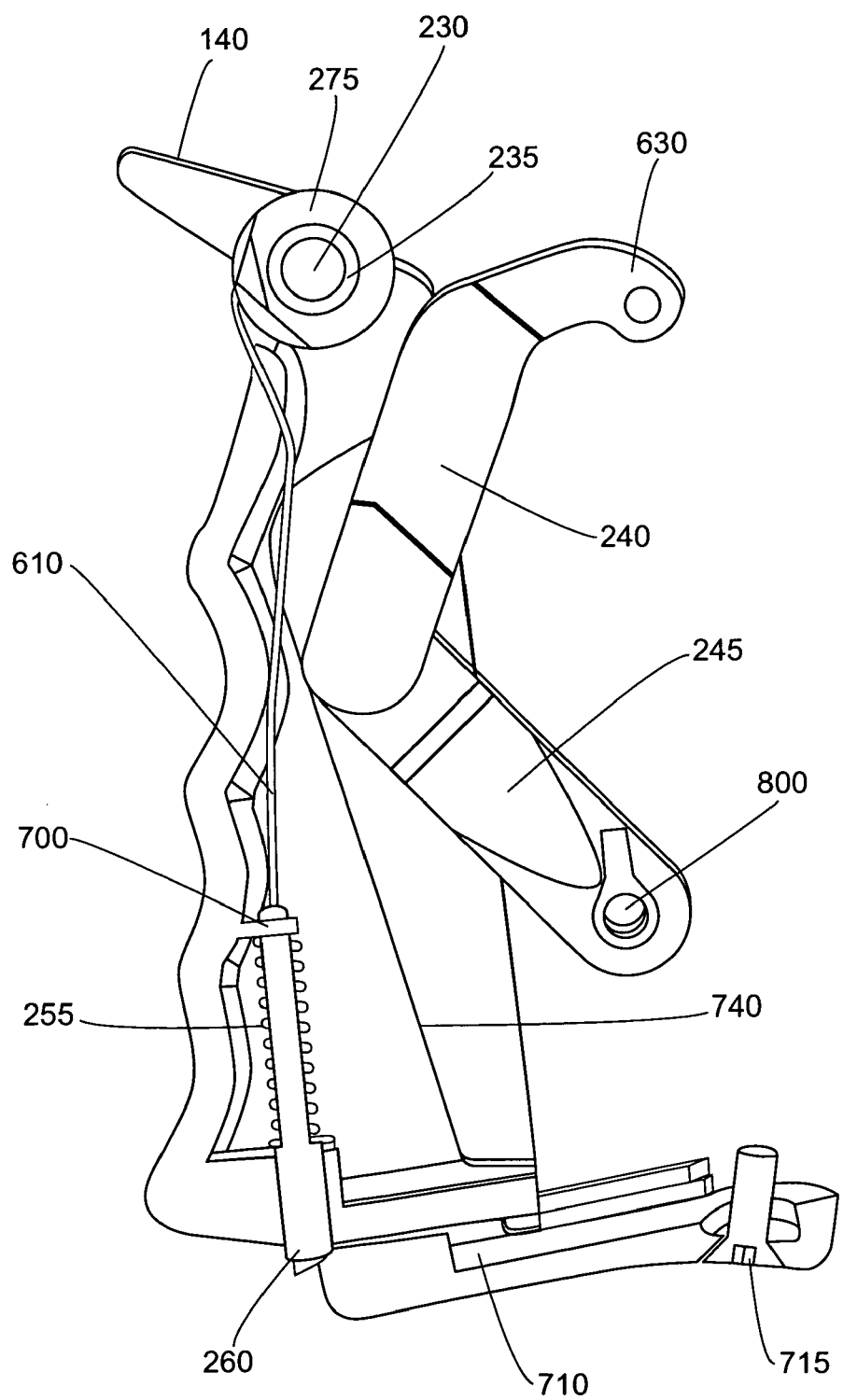
FIG. 9 displays a side view of the trigger, latching mechanism, linkage lever, and bottom plate isolated from other elements of the handle.
Figure 10:
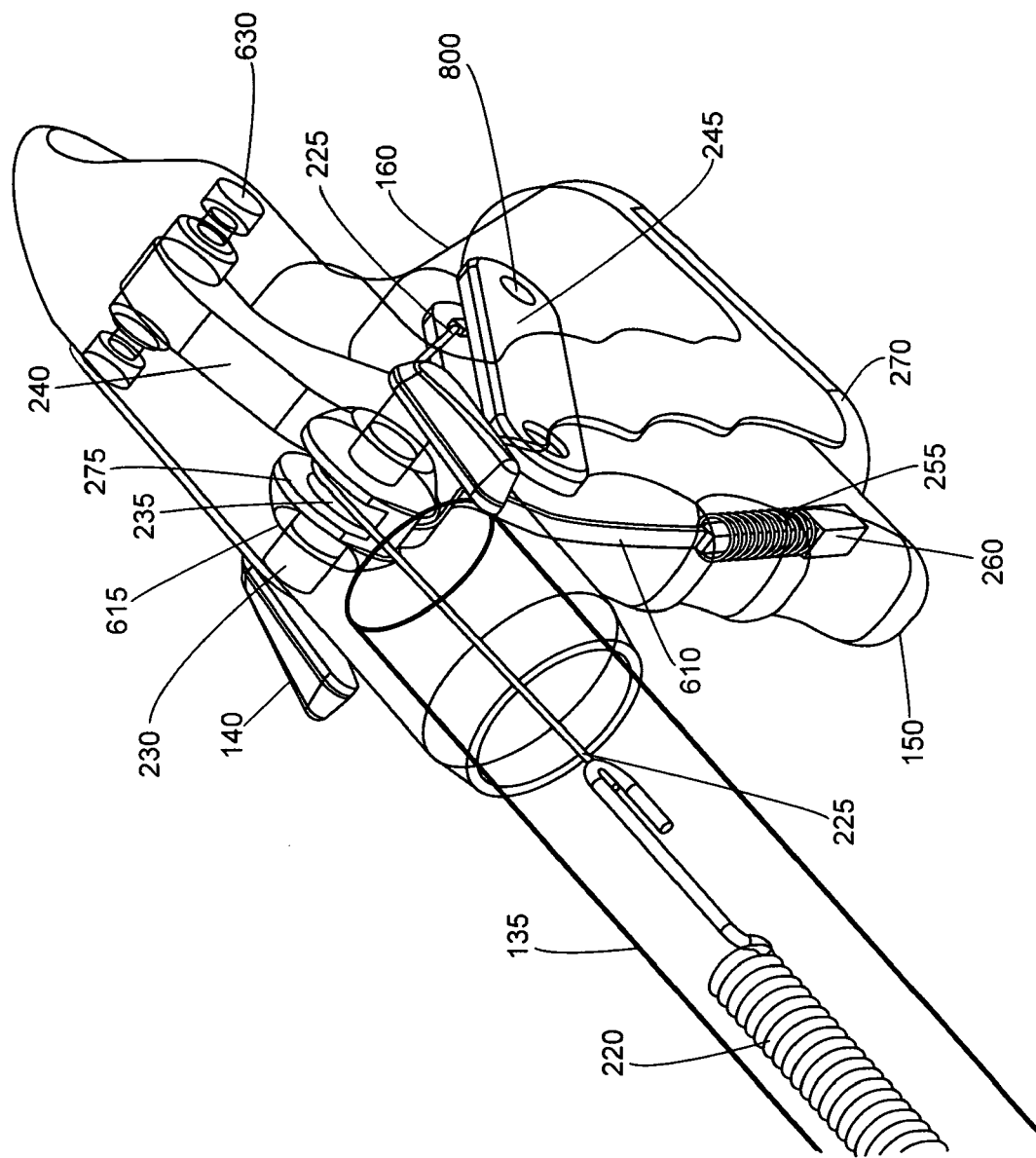
FIG. 10 displays a perspective view of the handle, trigger, linkage lever, and latching mechanism of an exemplary pick up device of the invention.
Figure 11:
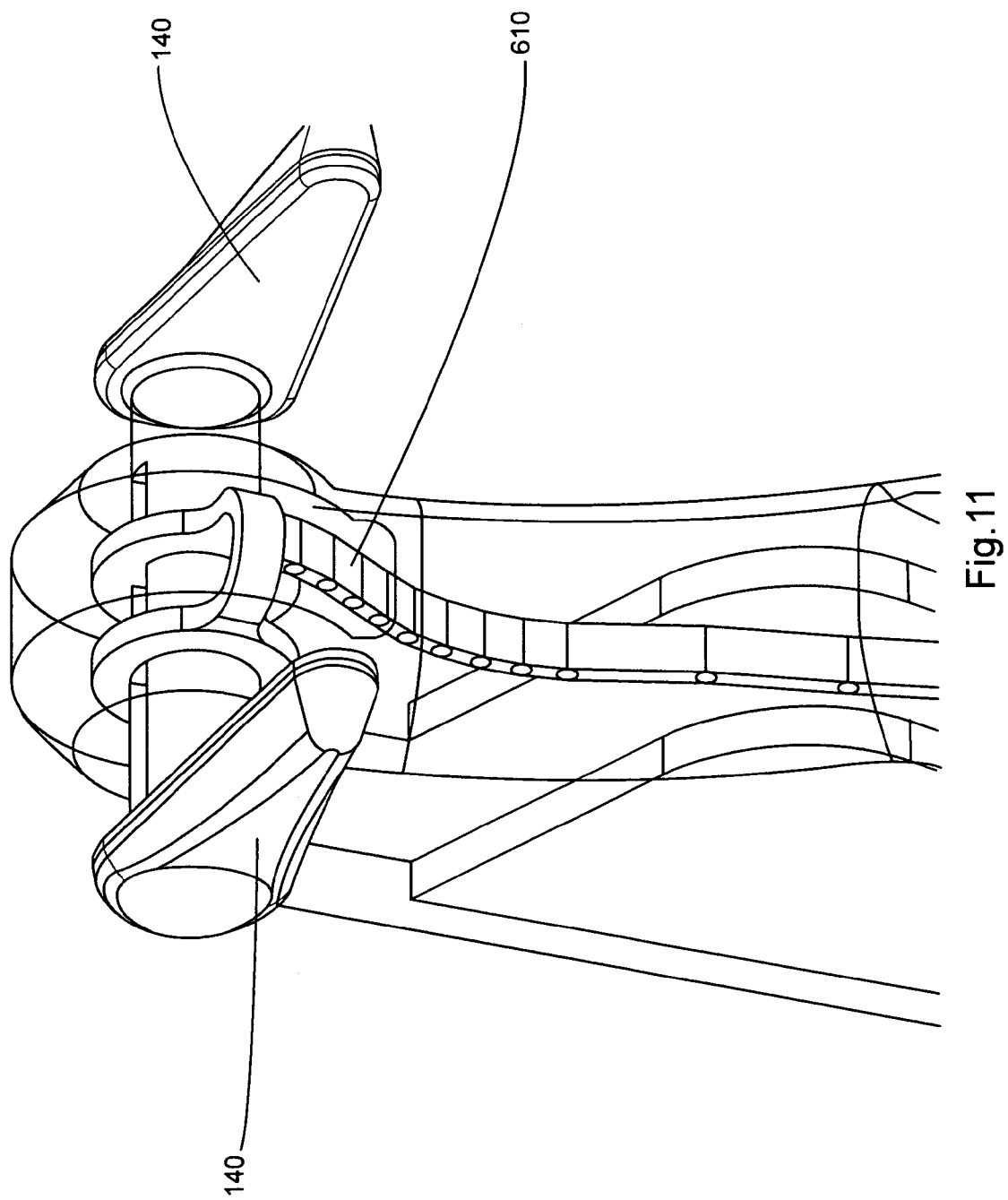
FIG. 11 displays a perspective view of the latching mechanism of an exemplary pick up device of the invention.

As can be seen in the figures, cable 225 and linkage lever 240 (upper linkage) and 245 (lower linkage) (collectively, the leverage action mechanism) are also comprised within the handle body. As stated previously, the cable is attached within the tube at its distal end to the cable spring. The proximal end of the cable enters the handle body, rests upon roller 235 (which optionally encircles the latching lever shaft and which is between 2 wings or walls of latching disc 275) traverses the length of the interior of the handle and attaches to the lower linkage lever 245 at attachment point 800. In some embodiments, the cable can rest directly upon lever shaft 230 rather than upon a roller such as roller 235. As can be seen from FIGS. 8 and 10, the cable is kept in place on the roller by sidewalls or wings of the latching disc. FIG. 8 shows half of the latching disc. Typical embodiments comprise a corresponding mating wall of the latching disc. The latching disc is typically sandwiched between the trigger grip pivot areas. See FIGS. 8, 10, and 11. The linkage lever is moveably hinged at 630 (top) and 625 (middle), while free at end 645. In certain embodiments, the free end of the lever moves within a track or groove within the handle body or within the free space present within the handle body. Thus, the lever is movable when the trigger grip is squeezed. When the grip is squeezed, pressure is applied upon the lever, which is pushed backwards and stretches out (e.g., free end 645 moves towards handle cap at base of handle body), thus, pulling the attached cable (hence the trigger is a leverage action trigger). In certain embodiments, the joint between the upper and lower linkages slides along slope 740 on the inner wall of the trigger, thereby producing a smooth action of pulling on the cable. FIG. 10 shows a three dimensional perspective of an embodiment of the linkage lever wherein the lower linkage lever comprises two mated, mirrored parts, through which cable 225 traverses. The embodiment in FIG. 10 also comprises a linkage upper lever that optionally comprises a single piece having a slot or opening through which the cable traverses. See FIGS. 10 and 6. Of course, in other embodiments, the linkage lever can comprise, e.g., 2 single pieces (rather than the doubled pieces shown in the current figures) that are hinged and have the cable attached to their lower end, etc.

Also within the handle body is the latching mechanism. The latching mechanism comprises latching lever 140, latching lever shaft 230, latching disc 275, latching cable 610, latch spring 255, latch 260, latch stop plate 700, and latch recess area 710 (actually created by recess within handle cap, but used in latching action). As mentioned previously, the latch lever(s) (or latching levers) are present on the exterior of the handle body. The latch lever(s) 140, either on one or both sides of the body, can be positioned "off" or "on" by the user either before, during, or after the trigger grip is squeezed (e.g., to grasp an object). In certain embodiments, the latch lever can be locked "on" and/or "off." In other words, the latch lever when locked "on" will allow the latch to function when the trigger is squeezed beyond a certain point. See below. When the latch lever is "off" the latch will not function even when the trigger is squeezed beyond the required distance. See below. In certain embodiments, the locking of the latch occurs by turning or pushing latching lever 140 past a designated point. In some embodiments, the body of the handle comprises a ridge, bump, or other protuberance (optionally comprised of the same material as the handle body) positioned within the motion range of lever 140. Thus, in some embodiments, when the lever is pushed up, it will be forced above the ridge by the action of the user. In such instances, the lever will catch on the ridge which will prevent the lever from moving back downwards. Thus, in such example, the lever will be in an "off" position and therefore the latching mechanism will not be able to be engaged.

At the bottom end of latch 260 certain embodiments comprise a beveled or sloped edge. Such bevel/slope edge is on the side of the latch facing towards handle cap 155, and allows for the latch to move more easily up and over the handle cap when the trigger is squeezed. Certain elements of the handle cap also comprise a corresponding bevel/slope area 635 as well.

In various embodiments, the latch spring, latch cable, and cable comprise one or more metal (e.g., aluminum, anodized aluminum, steel, stainless steel, magnesium, magnesium alloy(s), iron, or various alloys and/or combinations thereof). In some embodiments, the latch spring, latch cable, and cable comprise stainless steel. In various embodiments, the latch lever, latch, latch lever shaft (also referred to as latching lever shaft), latch stop plate, and latching disc comprise a metal (e.g., aluminum, anodized aluminum, steel, stainless steel, magnesium, magnesium alloy(s), iron, or various alloys and/or combinations thereof), plastic (e.g., a polycarbonate, a polyvinyl, a thermoplastic, a thermoplastic rubber, a thermoplastic elastomer, etc.), ceramic, polymer, resin, wood, or any combinations thereof. In certain embodiments, the latch lever, latch, latch lever shaft, latch stop plate, and latching disc comprise Lexan and/or Delrin and the latch spring, (and optionally latch cable) comprise stainless steel. In some embodiments, the latch cable and/or the cable comprises nylon. In some embodiments, the latch cable and/or the cable comprises an articulated strap, strap, wire, chain, or other similar cable-like element Exemplary Operation The devices of the invention are capable of use in a number of ways and for a number of methods. Thus, description of specific uses herein should not necessarily be taken as limiting. In certain embodiments, the device is held, via the handle within a user's hand, with the user's fingers wrapped around trigger 150, and the user's palm against the back of the handle at palm rest 160. Again, as mentioned above, areas where a user holds the device can comprise material to help prevent slippage (a problem of special concern with users who are elderly or who have poor gripping ability) and/or to present a decorative aspect (e.g., a contrasting color and/or texture). Thus, the palm rest at the back of the handle can comprise, e.g., an overmolded layer of rubber, thermoplastic rubber, thermoplastic elastomer, or the like. In some embodiments, the trigger can also comprise, thermoplastic elastomer and/or thermoplastic rubber (e.g., as an overmolded layer on, e.g., Lexan, etc.). Some embodiments in the figures comprise a stippled appearance in regions that are optionally colored in various devices. Of course, it will be appreciated that different embodiments can comprise different colors/textures/patterns/etc. in different areas of the devices in the different embodiments. Such colors, etc., can add to the aesthetically pleasing shape of the devices. In additional embodiments, the device can further comprise a forearm brace running from the handle back along the user's forearm to help support the device. Such braces are especially useful for users having poor wrist strength. Also as mentioned above, the entire head of the device (i.e., region A in FIG. 1) can be rotated in various embodiments in order to produce the proper angle for grasping. See above.

Once the head is properly angled and the device is properly held, the user typically squeezes trigger 150 in order to grasp an object. Squeezing the trigger pushes linkage lever 240/245 back and down within the handle (typically tracking along slope 740). The downward movement of the linkage lever pulls cable 225 (which is attached to the lower linkage lever at point 800) along with it. Cable 225, in turn, pulls on cable spring 220. Cable spring 220, optionally stretching during the action, pulls on jaw actuator rod 215. The jaw actuator rod pulls on jaw actuator 205 (e.g., by pulling on the jaw actuator cap) and thus pulls proximal ends 305 of the jaw members 120 back into the jaw base assembly while the distal ends of the jaw members and jaw pads 105, pivot and are pulled towards one another.

It will be appreciated that a wide range of different sized and/or different shaped objects can be grasped by the device. Small objects can optionally be grasped between the jaw pads on the end of the jaw members while larger objects can be grasped between the pads or in the larger area between the jaw members. As seen in the figures, the jaw members are angled so that they encompass a wide opening between them. In some instances, e.g., when an object to be grasped is large enough to require the jaw members to be fully opened, the trigger can still be pulled back (e.g., far enough to lock, see below) and pressure applied to grip the object. In such instances, cable spring 220 will stretch to allow trigger movement and applied pressure even without movement of the jaw members (e.g., when the jaws are held to their greatest extension around a large object). Of course, in some embodiments, the cable spring can stretch and aid in grasping/gripping of objects even when the jaws are not fully extended.

As will be appreciated, in various embodiments, the jaw members can be moved (e.g., closed) over a greater distance than the distance that the trigger is moved. Such embodiments allow for use of the device to grasp a wider range of objects than would otherwise be possible. In some embodiments, the trigger can be moved, e.g., ~1.5 inches while the tips of the jaw members close, e.g., ~5, ~5.5, or ~6 inches (e.g., the distance between them). In certain embodiments, such ratio between the distance the trigger is squeezed (moved) and the distance the tips of the jaws move can comprise about 1.5:5, 1.5:5.5, 1.5:6, 1.5:6.5, 1:5, 1:5.5, 1:6, 1:6.5, 0.5:5, 0.5:5.5, 0.5:6, 0.5:6.5, etc. In various embodiments, the tips of the jaw members move a greater distance than the distance moved by the trigger.

Another feature of the device comprises a latching or locking system (a latching mechanism) which allows the jaw members to be fixed in place (e.g., while grasping an object). This feature is especially important for users who cannot maintain a constant grip pressure, thus allowing them to grasp an object, lock the jaw members, and not have to keep applying constant pressure on the trigger. In various embodiments, the locking action can engage no matter the placement of the jaw members (e.g., jaws fully opened, jaws partially opened, jaws fully closed, etc.). To engage or disengage the locking (or latching) mechanism, which can be done before, during, or after grasping of an object, the user moves latching lever 140. As stated previously, in various embodiments, the lever can be present on both sides of the handle body (see FIG. 10) or the lever can be present on only one side of the handle body. To disengage the latch mechanism, in typical embodiments, the latch lever is pushed upwards by the user (e.g., by the user's thumb). Within the range of motion of the latch lever, various embodiments comprise a ridge, bump, or other protuberance on the handle body, which can be part of the handle body. See ridge 190 in FIG. 1. In certain embodiments, the lever is flush or substantially flush with the body of the handle so when it is pushed upwards, it is moved up and over the ridge by force from the user. Additionally, and/or alternatively, the latch lever can comprise a ball bearing or opposing ridge on its side facing the body of the handle, which ball bearing, ridge, or similar protuberance on the latch lever interacts with the ridge or protuberance on the handle body. Once the latching lever is above the ridge it tends to stay there until moved downwards by the user. Movement of the latch lever upwards, rotates latching lever shaft 230 and latch disc 275 (or in some embodiments which disc is rotated by latching lever shaft). Such rotation pulls on latch cable (or strap, etc.) 610 which pulls latch 260 upwards. If the latch is pulled upwards, then even when the trigger is squeezed and moves into the body of the handle, the latch will not be able to extend downwards into recess area 710 in order to latch the jaws.

In uses when the user desires to engage the locking mechanism, latching lever 140 is not pushed upwards (or is pushed downwards below the ridge/protuberance if it the latching lever is above such). Thus, when the trigger is squeezed and moves back into the body of the handle, latch 260 (which can be sloped/beveled on the bottom) moves up and into the body of the handle over area 635. When the trigger is squeezed far enough back, the latch is pushed down into recess 710 by action of latch spring 255. The latch spring pushes against latch plate 700 and the top of the latch. When the latch is moved in position above the latch recess, the latch spring (e.g., a compression spring) pushes the latch into the recess where it catches on the interior of the handle cap and thus "locks" the trigger in place. Since the trigger is locked in place, it therefore causes the linkage lever to be locked in place, which in turn causes the cable and/or cable spring to be locked in place, which causes the jaw members to be locked in place. To release the lock, users can move the latching lever upwards. See above.

As stated previously, the locking mechanism can be engaged (when it is switched "on") no matter the size of the object being grasped. For example, if a small object is to be grasped between the tips/pads of the jaw members or if a large object is to be grasped between the main bodies of the jaw members so that the jaws are at their widest, the jaws can still be latched. In either instance, the trigger is squeezed until the object is grasped. In some embodiments, the amount of trigger squeezing necessary just to grasp the object can be enough to push the trigger, and hence the latch, back far enough into the handle so that the latch is capable of engaging and locking the trigger (if the latch is "on"). However, the current invention also provides that once an object is grasped (and, thus, the jaws held a certain distance apart), the user can still squeeze the trigger far enough into the handle to engage the latch no matter the size of the object held. This is because the cable spring in the tube region will stretch when pressure is applied to the trigger but the jaw members cannot move. Such expansion/stretch, thus, allows the cable to move proximally and the trigger to be moved far enough into the handle so that the latch is engaged (when it is "on") no matter the size of the object being held.

While the foregoing invention has been described in some detail for purposes of clarity and understanding, it will be clear to one skilled in the art from a reading of this disclosure that various changes in form and detail can be made without departing from the true scope of the invention. For example, all the techniques and apparatus described above may be used in various combinations. All publications, patents, patent applications, or other documents cited in this application are incorporated by reference in their entirety for all purposes to the same extent as if each individual publication, patent, patent application, or other document were individually indicated to be incorporated by reference for all purposes

What is claimed is:

1. A pick up device for grasping an object, the device comprising:
  a) a head region comprising two opposing angled jaw members, each of which jaw members comprises a proximal end and a distal end, and each of which jaw members is operably attached at a pivot point to a jaw base assembly, thus allowing movement of each jaw member around its pivot point; wherein the proximal end of both jaw members operably interacts with a jaw actuator within the jaw base assembly, which said jaw actuator is operably connected to an actuator rod and a jaw actuator spring;
  b) a tube region comprising an elongated hollow tube enclosing a cable spring and a cable, which said cable spring and said cable are operably connected to the actuator rod; and,
  c) a handle region comprising a handle body having a base, a latch mechanism, and a trigger having a linkage lever having a free end, wherein the cable is operably coupled to the free end of the linkage lever;
  wherein squeezing the trigger causes the linkage lever to extend in the handle body towards the base of the handle body thus causing the cable and the cable spring to move proximally in the handle body and in the tube region, which movement causes the jaw actuator rod and jaw actuator to move proximally, which in turn, draws in the proximal end of each jaw member, thus causing each jaw member to move around its pivot point and causing the distal ends of the opposing jaw members to move towards one another.

2. The device of claim 1, wherein the jaw members comprise a textured inner surface layer.

3. The device of claim 1, wherein each jaw member comprises a pad area at its proximal tip.

4. The device of claim 1, wherein the jaw actuator spring exerts pressure against the proximal end of the jaw actuator which causes the distal ends of the jaw members to pivot away from each other as the jaw actuator is pushed distally.

5. The device of claim 1, wherein the latch mechanism comprises a spring loaded latch operably attached to a latch cable that is operably coupled to a latching lever, which latch mechanism when engaged, reversibly locks the trigger, thereby reversibly locking the jaw members at a desired position.

6. The device of claim 5 wherein expansion of the cable spring allows the trigger to be squeezed further in even when the jaw members cannot move closer together, thus allowing the trigger to move far enough into the handle body so that if the latching lever is set, the spring loaded latch will engage and prevent the jaw members from opening.

7. The device of claim 1, wherein the movement of the trigger causes a movement of the jaw members over a greater distance than that moved by the trigger.

8. The device of claim 1, wherein the handle body comprises a palm rest area, which palm rest area comprises one or more of a thermoplastic rubber or a thermoplastic elastomer overlay on the handle body.

9. The device of claim 1, wherein the head region can be rotated in relation to the tube region, and secured in one or more orientations.

10. A method of grasping or picking up an object, the method comprising:
  a) situating two opposing angled jaw members of a device around the object, each of which jaw members comprises a proximal end and a distal end, and each of which jaw members is operably attached at a pivot point to a jaw base assembly, which allows movement of each jaw member around its pivot point; wherein the proximal end of both jaw members operably interacts with a jaw actuator within the jaw base assembly, and which said jaw actuator is operably connected to an actuator rod; the device also comprising an elongated hollow tube region, enclosing a cable spring and a cable, which said cable spring and said cable are operably connected to the actuator rod; the device also comprising a handle region comprising a handle body having a base, a latch mechanism, and a trigger having a linkage lever having a free end, wherein the cable is operably coupled to the free end of the linkage lever; and,
  b) squeezing the trigger causing the linkage lever to extend in the handle body towards the base of the handle body thus causing the cable and cable spring to move proximally, and causing the jaw actuator rod and jaw actuator to move proximally, and in turn, drawing in the proximal end of each jaw member, thus causing each jaw member to move around its pivot point and causing the distal ends of the opposing jaw members to move towards one another and thus grasp or pick up the object.

* * * * *